US008573793B2

(12) United States Patent
Wang et al.

(10) Patent No.: US 8,573,793 B2
(45) Date of Patent: Nov. 5, 2013

(54) ELECTRODE PLATE FOR EXTERNAL ELECTRODE LAMP AND BACKLIGHT

(75) Inventors: Fei Wang, Beijing (CN); Laiyou Cui, Beijing (CN); Zhanchang Bu, Beijing (CN); Fang Kang, Beijing (CN); You Li, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 237 days.

(21) Appl. No.: 13/223,470

(22) Filed: Sep. 1, 2011

(65) Prior Publication Data

US 2012/0057329 A1 Mar. 8, 2012

(30) Foreign Application Priority Data

Sep. 3, 2010 (CN) ...................... 2010 2 0518099 U

(51) Int. Cl.
*G02F 1/1335* (2006.01)

(52) U.S. Cl.
USPC ............... 362/97.1; 362/225; 349/58; 349/70

(58) Field of Classification Search
USPC ............ 362/97.1, 97.2, 382, 217.12, 65, 225, 362/249.01, 29, 97.3, 97.4, 240, 559, 260, 362/561, 611, 613, 614, 227, 216, 600, 219, 362/581, 631–634, 217.08–217.17; 349/58–60, 856, 70, 552, 139, 149; 439/336, 226, 232, 834, 558, 239–241, 439/880, 856–857
See application file for complete search history.

(56) References Cited

U.S. PATENT DOCUMENTS

| | | | | |
|---|---|---|---|---|
| 8,415,898 | B2 * | 4/2013 | Hayashi | 315/307 |
| 2006/0121779 | A1 * | 6/2006 | Jang et al. | 439/552 |
| 2007/0030691 | A1 * | 2/2007 | Jang et al. | 362/559 |
| 2009/0213293 | A1 * | 8/2009 | Sekiguchi et al. | 349/58 |
| 2010/0026924 | A1 * | 2/2010 | Yang et al. | 349/58 |
| 2010/0182768 | A1 * | 7/2010 | Yun et al. | 362/97.1 |

* cited by examiner

*Primary Examiner* — Anh Mai
*Assistant Examiner* — Fatima Farokhrooz
(74) *Attorney, Agent, or Firm* — Ladas & Parry LLP

(57) ABSTRACT

An electrode plate for an external electrode fluorescent lamp and a backlight are disclosed. The electrode plate for external electrode lamp comprising a strip pressure plate made of conductive material, wherein the strip pressure plate comprises a first surface on which at least one groove are provided and a second surface that is opposite to the first surface, the grooves run across both sides of the first surface and accommodate external electrodes of the external electrode lamps.

16 Claims, 2 Drawing Sheets

ELECTRODE PLATE FOR EXTERNAL ELECTRODE LAMP AND BACKLIGHT

BACKGROUND

Embodiments of the disclosed technology related to an electrode plate for external electrode lamp and a backlight.

The structure of an EEFL (External Electrode Fluorescent Lamp) is shown in FIG. 1. In FIG. 1, there is no electrode within the EEFL which comprises a glass tube 1 and metal electrodes 2 at both ends of the glass tube 1. Inert gas 3 is sealed in the glass tube 1, the inner wall of which is coated with fluorescent powders.

During operation, a high-frequency voltage applied across the external electrodes 2 is introduced into the glass tube 1 of the EEFL by capacitive coupling to excite the inlet gas and release energy. As a result, the energy released by the inlet gas raises atoms of the fluorescent powders on the inner wall of the glass tube 1 to a higher energy level. Visible light is emitted when the excited atoms return to the initial lower energy level.

Another type of EEFL is formed by modifying an existing internal electrode fluorescent lamp. External metal electrodes are provided to both ends of the existing internal electrode fluorescent lamp and connect to the internal electrodes. In this case, a high-frequency voltage applied across the external metal electrodes is directly coupled into the glass tube by electrical conduction.

The conventional method of fixing EEFLs which are adapted as light sources in a backlight is performed as follows. A plastic plate or a printed circuit board used as a base is placed onto the back plate (or frame) of the backlight; pairs of opposing electrode sockets are provided for mounting the EEFLs, and the sockets comprise an inside conductive structure and an insulating package; and each EEFL is directly plugged into one pair of electrode sockets. However, since the structure of the electrode sockets is quite complex and the cost of making the electrode sockets is quite high, the cost of fixing the EEFLs is too high.

SUMMARY

An embodiment of the disclosed technology provides an electrode plate for an external electrode lamp comprising a strip pressure plate made of a conductive material, the strip pressure plate comprising: a first surface on which at least one groove are provided, and a second surface that is opposite to the first surface, wherein the at least one groove runs across both sides of the first surface and capable of accommodating external electrodes of the external electrode lamp.

An embodiment of the disclosed technology provides a backlight comprising a back plate; at least one external electrode lamp; an insulation sheet provided between the back plate and the at least one external electrode lamp to electrically isolate the back plate from the at least one external electrode lamp; two electrode plates adapted to respectively fix external electrodes of the at least one external electrode lamp at both ends onto the back plate and electrically isolated from the back plate, wherein each electrode plate comprises a strip pressure plate made of a conductive material; the strip pressure plate comprises a first surface on which at least one groove is provided and a second surface that is opposite to the first surface; the at least one groove runs across both sides of the first surface; and the external electrodes at both ends of the at least one external electrode lamp are pressed into the grooves on the two electrode plates to establish electrical contact; and power source input terminals respectively connected to the two electrode plates.

Further scope of applicability of the disclosed technology will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

According to an embodiment of the disclosed technology, external electrode lamps are fixed or mounted on a back plate by electrode plates, and each of the electrode plate comprises a strip pressure plate made of a conductive material. The strip pressure plate comprises a first surface, on which at least one groove is provided, and a second surface that is opposite to the first surface, the grooves are provided in the first surface and run across both sides of the first surface and accommodate external electrodes of the external electrode lamps. Power source is applied across the external electrodes of each external electrode lamp through the electrode plate, such that power source is supplied to the external electrode lamps.

Hereinafter, embodiments will be described in detail with reference to the accompanying drawings so that the objects, technical solutions and advantages of the embodiments will become more apparent. It should be noted that the embodiments described below are merely a portion of but not all of the embodiments of the disclosed technology, and thus various modifications, combinations or alterations can be made on the basis of the described embodiments without departing from the spirit and scope of the disclosed technology.

First Embodiment

Figure 1:
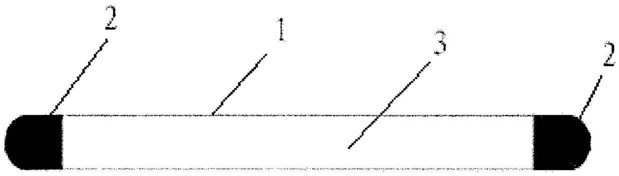
FIG. 1 is an outside drawing showing an EEFL in prior art.
Figure 2:
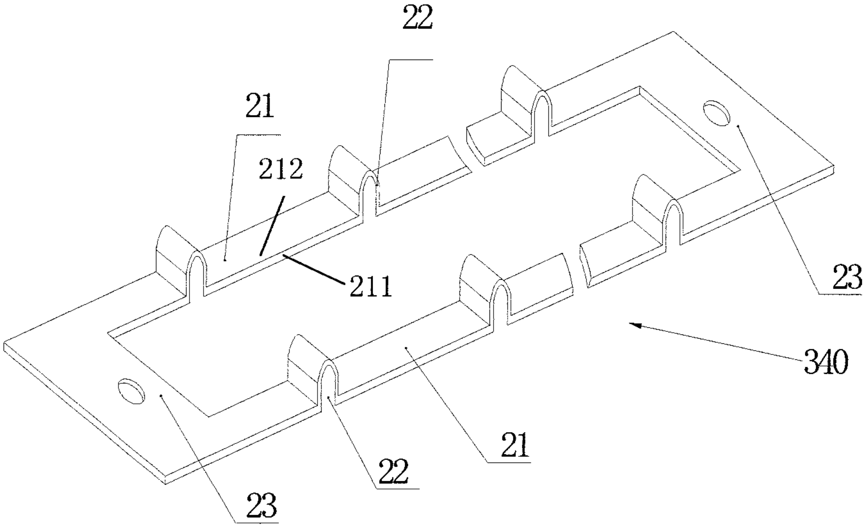
FIG. 2 is a structural schematic view showing the electrode plate in the first embodiment of the disclosed technology.

A first embodiment of the disclosed technology provides an electrode plate for external electrode lamps as shown in FIG. 2. The electrode plate 340 comprises a strip pressure plate made of a conductive material, such as a metal material. The strip pressure plate 340 has a first surface 211 and a second surface 212 that is opposite to the first surface 211. Grooves 22 which run across both sides of the first surface 211 are provided on the first surface 211 and match the external electrodes of the external electrode lamps accommodated in the grooves 22. When the electrode plate is used to fix external electrode lamps, the grooves 22 on the electrode plate 20 will be pressed onto the external electrodes of the external electrode lamps, and the electrode plate 20, together with the external electrode lamps, is fixed on a back plate in a backlight.

Generally, a pressure plate having a certain thickness (not shown) can be used for the strip pressure plate; in this case, the grooves may be directly formed or cut on the first surface of the pressure plate. In addition, a sheet-like pressure plate can also be used for the strip pressure plate; in this case, the grooves can be formed on the first surface of the sheet like pressure plate by stamping or the like processing. As a result, convexes corresponding to the grooves appear on the second surface that is opposite to the first surface.

In particular, each electrode plate may comprise one strip pressure plate or at least two strip pressure plates which are arranged parallel to each other within the same plane. FIG. 2 shows an example of two strip pressure plates, and these two strip pressure plates are arranged parallel to each other along the length direction. Three or more strip pressure plates can also be used as well. These strip pressure plates can be connected together. As shown in FIG. 2, the adjacent strip pressure plates 21 are connected to each other by connecting plates 23 at both ends to form a frame structure. The connecting plates 23 may be formed of a conductive material as well. The grooves on all the strip pressure plates 21 are on the same side and align with each other in groups.

In addition, flexible conductive materials such as conductive adhesive or spring can be provided within the grooves on the strip pressure plates 21 to closely contact the surfaces of the electrodes of the external electrode lamps, which are inserted into the grooves, and to avoid causing any damage to the electrodes.

The external electrode lamps can be fixed onto the back plate by using more than two electrode plates for external electrode lamps. Power source input terminals are directly connected to the electrode plates, thus power source can be directly applied to each external electrode lamp via the electrode plates. By using the electrode plates for external electrode lamps according to the embodiment of the disclosed technology, the external electrode lamps can be fixed without using any electrode socket. Since the structure of one electrode plate is simpler than that of an electrode socket and the cost of manufacturing the electrode plate is relatively low, the electrode plates for external electrode lamps and the backlight according to the embodiment of the disclosed technology can reduce the cost of fixing EEFLs.

Second Embodiment

A second embodiment of the disclosed technology provides a backlight in which the electrode plate in the first embodiment is adapted to fix external electrode lamps.

Figure 3:
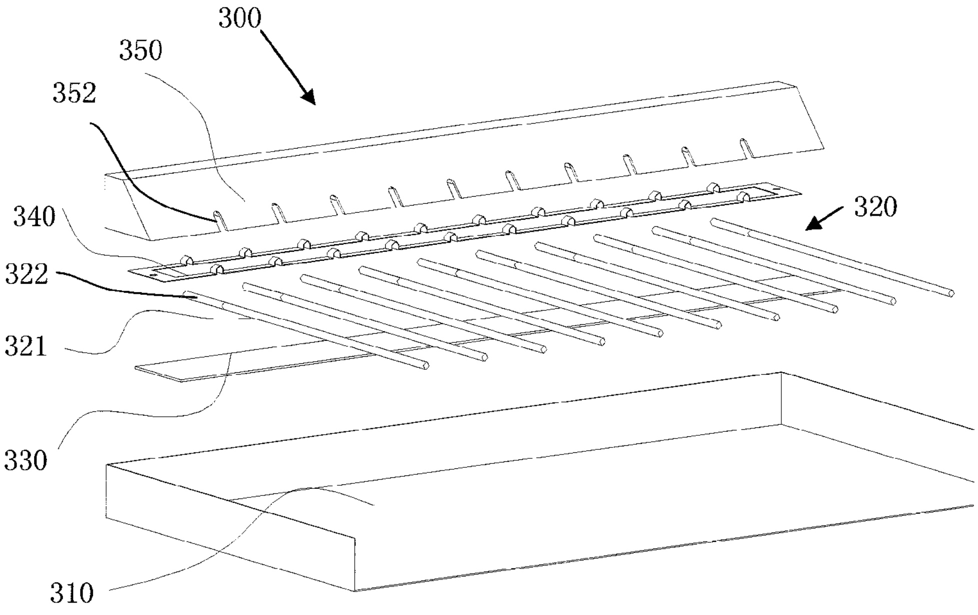
FIG. 3 is structural schematic view showing the backlight in the second embodiment of the disclosed technology.

Referring to FIG. 3, the backlight 300 comprises a back plate (or frame) 310 and at least one external electrode lamp 320 comprising lightening portion 321 and external electrodes 322 at both ends. For clarity, only the external electrodes at one end of the lamps 320 are shown in FIG. 3. All the external electrodes lamps are arranged on the back plate 310 side by side. For the convenience in mounting the external electrodes lamps 320 onto the back plate 310, attaching clamps which are commonly made of insulation material are used on the back plate to grip or hold the external electrode lamps. In particular, the attaching clamps only grip the lower portion or the external electrodes of the external electrode lamps in order to not block the light emitted by the external electrode lamp 320.

The backlight according to the embodiment of the disclosed technology further comprises insulation sheets 330, electrode plates 340, power source input terminals (not shown in FIG. 3) and insulating caps 350. Two sets of insulation sheet 330, electrode plate 340 and insulating cap 350 are respectively used for external electrodes 322 at the same ends of the external electrode lamps 320. Only one set of the insulation sheet 330, the electrode plate 340 and the insulating cap 350 which match the external electrode at one end of the external electrode lamps 320 is shown in FIG. 3. The backlight will be described in detail with reference to FIG. 3. The other end of the external electrode lamps is the same as what is shown in FIG. 3.

As shown in FIG. 3, in order to avoid current leakage caused by short-circuit between the external electrodes 322 and the back plate 310, the insulation sheet 330 is interposed between the external electrode lamps 320 and the back plate 310 to electrically isolate the back plate 310 from the external electrode lamp 320. In order to fix the external electrode lamps 320 onto the back plate 310, two electrode plates are used to respectively fix external electrodes at both ends of all the external electrode lamps onto the back plate, while the back plate 310 is kept electrically isolated from the external electrode lamps 320 by the insulation sheet 330. The following methods, but not limited to these methods, can be used to fix the electrode plate 340 onto the back plate 310:

1. The electrode plate 340 is fixed onto the back plate 310 by using insulation paste to avoid any electrical connection between the electrode plate 340 and the back plate 310.

2. The electrode plate 340 is fixed onto the back plate 310 by screws or rivets made of an insulation material to avoid any electrical connection between the electrode plate 340 and the back plate 310.

In the embodiment, two power source input terminals are respectively connected to the two electrode plate 340 to supply electrical power source to the external electrode lamps. For example, one of the two power source input terminals which go through via holes on the back plate 310 is connected to one of the two electrode plate 340, and the other power source input terminal is connected to the other electrode plate 340 via wiring in the peripheral area of the back plate 310.

Figure 4:
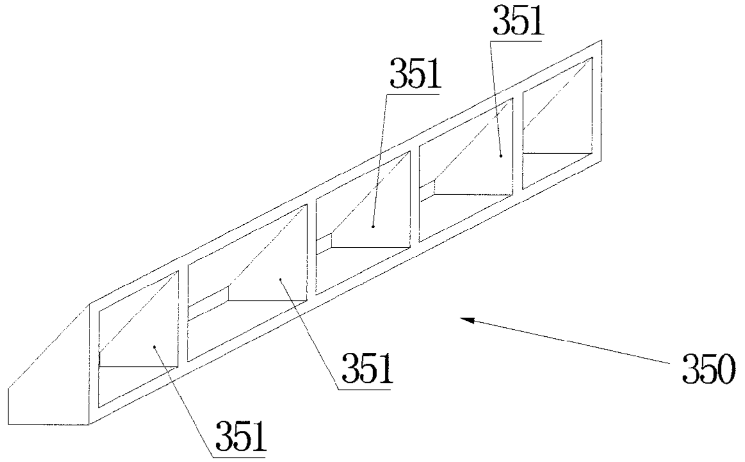
FIG. 4 is a structural schematic view showing insulating caps in the second embodiment of the disclosed technology.

As shown in FIG. 3, in order to prevent the electrode plate 340 and the external electrodes 322 from being electrically connected to other conductive portions of the backlight 300, the backlight according to the embodiment of the disclosed technology further comprises two insulating caps 350 which respectively cover the regions where the external electrodes 322 at both ends of all the external electrode lamps are located. Thus, the electrode plate 340 and the external electrodes 322 are isolate from the outside, while the lightening portions 321 in the middle of the external electrode lamps 320 are exposed. In order to make the electrical connection between the electrode plate 340 and the external electrodes 322 reliable and firm enough, at least one reinforcing rib 351 against the electrode plates 340 may be further provided inside the insulating cap 350 according to the embodiment of the disclosed technology. The reinforcing ribs 351 are used to apply pressure to the electrode plate 340, so that the electrode plates 340 and the external electrodes 322 can be tightly connected, and the electrode plates 340, the insulation sheet 330 and the back plate 310 are pressed together. No notch for accommodating EEFLs on the insulating cap 350 are shown in FIG. 4, it is necessary to provide notches on the outer edge of the insulating cap 350 (as shown in FIG. 3) in accordance with the EEFLs.

The structure of the electrode plate in the embodiment of the disclosed technology is the same as that in the first embodiment, as shown in FIG. 2.

The material of the electrode plate 340 in the embodiment of the disclosed technology comprises but not limited to: insulating cloth, insulating plastic, or printed circuit board. No matter which material is used to fabricate the insulation sheet, the examples of the insulation sheet 330 comprise, but not limited to, the following ways:

1. One piece of insulation sheet, the area of which is larger than the area where all the external electrode lamps are located, is used as the insulation sheet 330. With the one piece of insulation sheet, the external electrodes at both ends of all the external electrode lamps are electrically isolated from the back plate. All the external electrode lamps are also electrically isolated from the back plate by the one piece of insulation sheet to ensure that all the external lamps 320 are isolated from the back plate 310.

2. Two pieces of strip insulation sheet are used as the insulation sheet 330. Each piece of the strip insulation sheet is used to electrically isolate the external electrodes at same ends of all the external electrode lamps from the back plate. Since the lightening portions of all the external electrode lamps are non-conductive, the two pieces of strip insulation sheet can also be used to ensure that all the external lamps 320 are isolated from the back plate 310. In this case, a portion of insulation sheet is saved, compared to the first way.

The insulation sheet 330 generally is not too thick or too thin. If the insulation sheet 330 is too thick, the distance for mixing light emitted from the external electrode lamps is too short, and then the light cannot be mixed well. If the insulation sheet 330 is too thin, the external electrode lamps may become cracked easily. The thickness of the insulation sheet 330 according to the embodiment of the disclosed technology may be from 0.5 mm to 5 mm, for example, 1 mm, 2 mm, 3 mm, 4 mm, etc. Relatively thick insulation sheet can support the external electrode lamps and keep the external electrode lamps straight and unbent.

In the backlight according to the embodiment of the disclosed technology, the external electrode lamps are fixed onto the back plate by using two electrode plates; Power source input terminals are directly connected to the two electrode plates, thus power source can be directly applied to each external electrode lamp via the electrode plates. By using the electrode plates for external electrode lamp according to the disclosed technology, the external electrode lamps are fixed without using any electrode sockets. Since the structure of the electrode plate is simpler than that of one electrode socket and the cost of manufacturing the electrode plate is relatively low, the electrode plate for external electrode lamps and the backlight according to the embodiments of the disclosed technology can reduce the cost of fixing EEFLs.

The method of mounting the backlight according to the embodiments of the disclosed technology can comprise the following steps.

Step 1, placing the insulation sheet 330 onto corresponding regions on the back plate 310;

Step 2, conventionally arranging the external electrode lamps 320 on the back plate 310 and locking or fixing the external electrode lamps 320 by the attaching clamps to prevent them from dislocation;

Step 3, mounting two electrode plates 340 which are formed of a conductive sheet onto the external electrode portions at both ends of the EEFLs, respectively, wherein grooves are formed on the lower surface of the electrode plates 340 to accommodate the external electrode lamps 320 and to assure good electrical connection between the electrode plates 340 and the external electrodes 322 of the external electrode lamps 320.

Step 4, fixing the electrode plates with grooves on their lower surface onto the back plate, for example, by using insulation paste, insulation screws or rivets, or plastic joints;

Step 5, placing the insulating caps 350 over the regions where the external electrodes 322 at both sides of the external electrode lamps 320 are located, as shown in FIG. 4, reinforcing ribs 351 against the electrode plates 340 may be further provided inside the insulating cap 350, so that the electrode plates 340, the insulation sheet 330 and the back plate 310 are pressed together when they are assembled.

After mounting the backlight according to the above described method, the inverter for driving the lamps are electrically connected to the external electrodes of the lamps by the conductive electrode plates. Since the EEFLs are well fixed and electrically connected without using any plastic base or printed circuit board, the cost is lowered and the structure is simplified.

The embodiments of the disclosed technology are mainly used in a backlight, in particular, a direct downward type backlight.

The disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. An electrode plate for an external electrode lamp comprising a strip pressure plate made of a conductive material, the strip pressure plate comprising:

a first surface on which at least one groove are provided, and a second surface that is opposite to the first surface, wherein the at least one groove runs across both sides of the first surface and capable of accommodating external electrodes of the external electrode lamp wherein the electrode plate comprises at least two strip pressure plates which are arranged parallel to each other within the same plane; and the adjacent strip pressure plates are connected by connecting plates at ends.

2. The electrode plate for an external electrode lamp according to claim 1, wherein grooves are provided on the first surface, and the grooves on the strip pressure plates are provided on the same side and align with each other in groups.

3. The electrode plate for an external electrode lamp according to claim 1, wherein the connecting plates are made of a conductive material.

4. The electrode plate for an external electrode lamp according to claim 1, wherein the strip pressure plates comprises a thin sheet with grooves formed by stamping.

5. The electrode plate for an external electrode lamp according to claim 1, wherein the strip pressure plates comprises thin sheets with grooves formed by stamping.

6. The electrode plate for an external electrode lamp according to claim 3, wherein the strip pressure plates comprise thin sheet with grooves formed by stamping.

7. A backlight, comprising:

a back plate;

at least one external electrode lamp;

an insulation sheet provided between the back plate and the at least one external electrode lamp to electrically isolate the back plate from the at least one external electrode lamp;

two electrode plates adapted to respectively fix external electrodes of the at least one external electrode lamp at both ends onto the back plate and electrically isolated from the back plate, wherein each electrode plate comprises at least two strip pressure plates which are arranged parallel to each other within the same plane and the adjacent strip pressure plates are connected by connecting plates at ends, wherein each strip pressure plate is made of a conductive material; the strip pressure plate comprises a first surface on which at least one groove is provided and a second surface that is opposite to the first surface; the at least one groove runs across both sides of the first surface; and the external electrodes at both ends of the at least one external electrode lamp are pressed into the grooves on the two electrode plates to establish electrical contact; and power source input terminals respectively connected to the two electrode plates.

8. The backlight according to claim 7, wherein the insulation sheet comprises a insulation sheet, the area of which is larger than the area of a region where the at least one external electrode lamp is located; or the insulation sheet comprises two strip insulation sheets which respectively electrically insolate the back plate from the external electrodes at both ends of the at least one external electrode lamp.

9. The backlight according to claim 8, wherein the material of the insulation sheet comprises insulating cloth, insulating plastic or printed circuit board.

10. The backlight according to claim 7, wherein the material of the insulation sheet comprises insulating cloth, insulating plastic or printed circuit board.

11. The backlight according to claim 7, wherein the insulation sheet has a thickness in a range from 0.5 mm to 5 mm.

12. The backlight according to claim 8, wherein the insulation sheet has a thickness in a range from 0.5 mm to 5 mm.

13. The backlight according to claim 7, further comprising two insulating caps respectively covering regions where the external electrodes at both ends of the at least one external electrode lamp are located.

14. The backlight according to claim 13, wherein at least one reinforcing rib against the electrode plate is provided within each of the insulating caps.

15. The backlight according to claim 7, wherein attaching clamps are provided on the back plate to hold the at least one external electrode lamp.

16. The backlight according to claim 7, wherein the electrode plates are fixed onto the back plate by insulating adhesive.

* * * * *